(12) United States Patent  
Fukui et al.

(10) Patent No.: US 8,164,690 B2  
(45) Date of Patent: Apr. 24, 2012

(54) IMAGE DISPLAY DEVICE FOR EXPANDING AND DISPLAYING PART OF AN IMAGE

(75) Inventors: Hideaki Fukui, Tokyo (JP); Akira Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1285 days.

(21) Appl. No.: 11/840,377

(22) Filed: Aug. 17, 2007

(65) Prior Publication Data

US 2008/0049141 A1 Feb. 28, 2008

(30) Foreign Application Priority Data

Aug. 21, 2006 (JP) ................................. 2006-224655

(51) Int. Cl.
*H04N 1/393* (2006.01)
*H04N 5/445* (2011.01)
*H04N 5/45* (2011.01)

(52) U.S. Cl. ........ 348/561; 348/581; 348/565; 348/704; 348/739; 382/298

(58) Field of Classification Search ............ 348/565, 348/561, 704, 581, 584, 564, 739; 382/298
See application file for complete search history.

(56) References Cited

U.S. PATENT DOCUMENTS

| 7,068,914 | B2 | 6/2006 | Ozawa et al. |
| 7,302,160 | B1 * | 11/2007 | Wells ........................... 386/250 |
| 7,375,769 | B2 * | 5/2008 | Yui ............................... 348/584 |
| 7,489,363 | B2 * | 2/2009 | Choi ............................. 348/581 |
| 7,768,576 | B2 * | 8/2010 | Yui et al. ...................... 348/564 |

FOREIGN PATENT DOCUMENTS

JP 2002-142171 5/2002

* cited by examiner

*Primary Examiner* — Jefferey Harold
*Assistant Examiner* — Jean W Desir
(74) *Attorney, Agent, or Firm* — Turocy & Watson, LLP

(57) ABSTRACT

An image display device includes an MPEG decoder configured to generate image signals based on digital signals received by a tuner unit, an image segmenting unit configured to extract image signals included in a segment area being an arbitrary area portion from image signals outputted from the MPEG decoder, a display position adjusting unit configured to set a display area being an arbitrary area portion displaying the extracted image signals, an expansion display producing unit configured to allocate the extracted image signals to the display area to generate an expanded image, and a video synthesizing unit configured to synthesize image signals outputted from the expansion display producing unit and image signals outputted from the MPEG decoder.

16 Claims, 10 Drawing Sheets

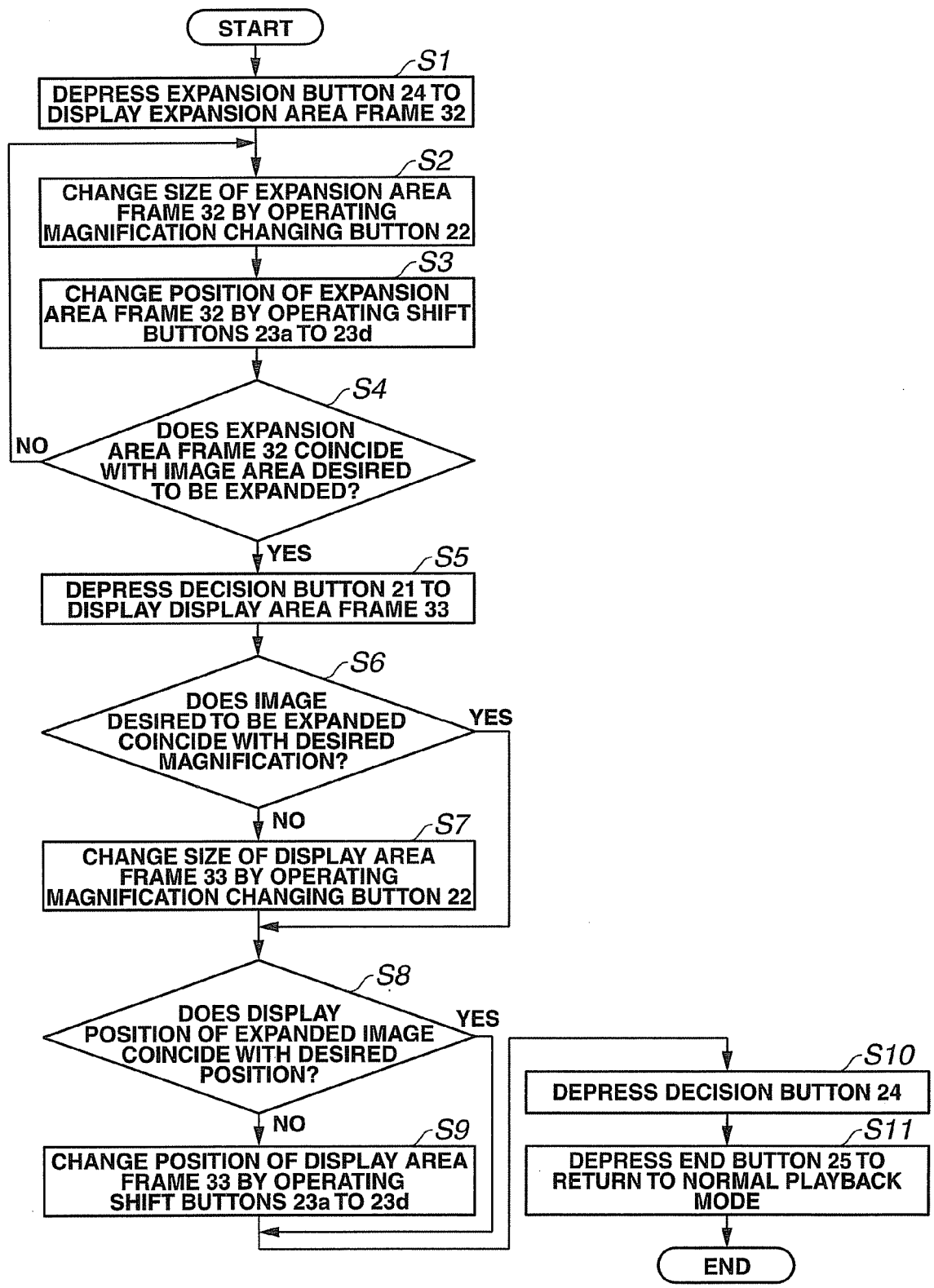

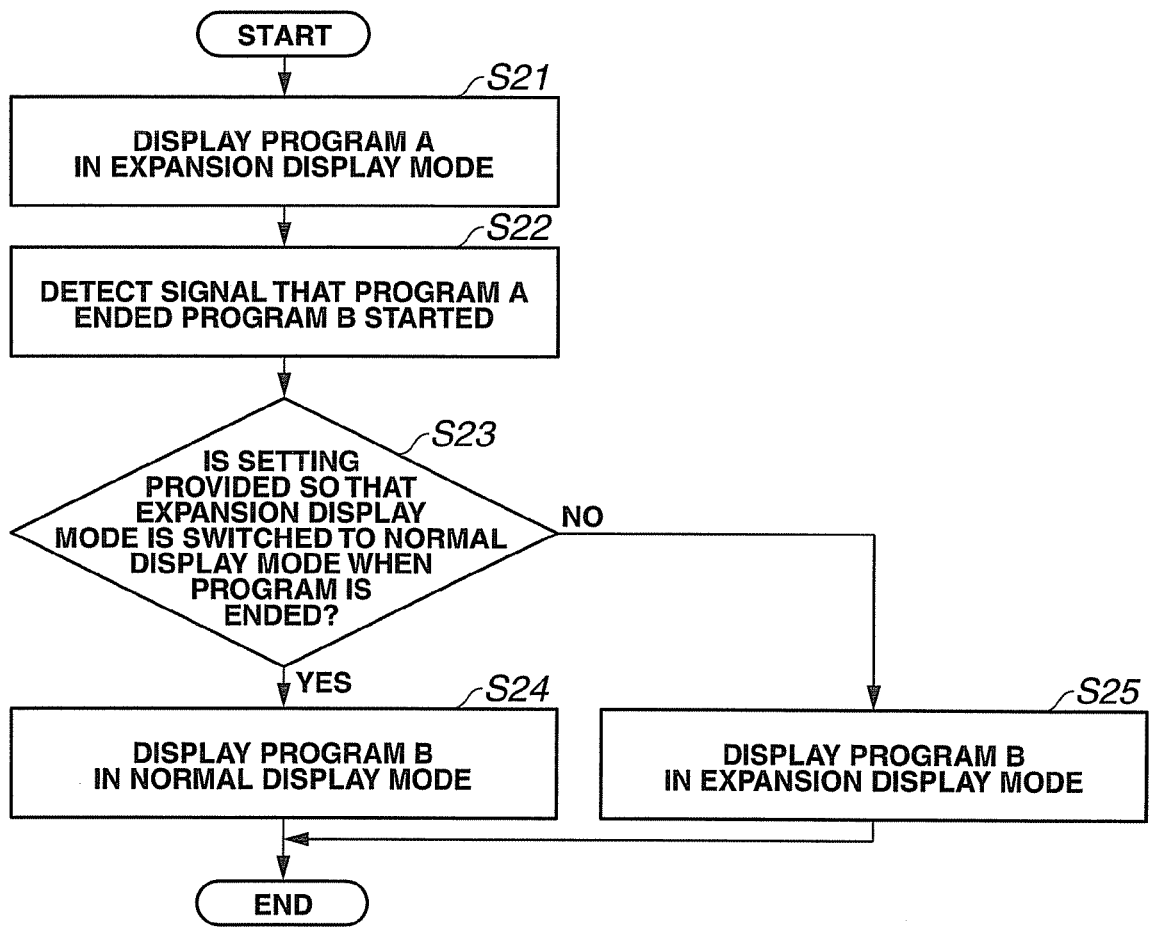

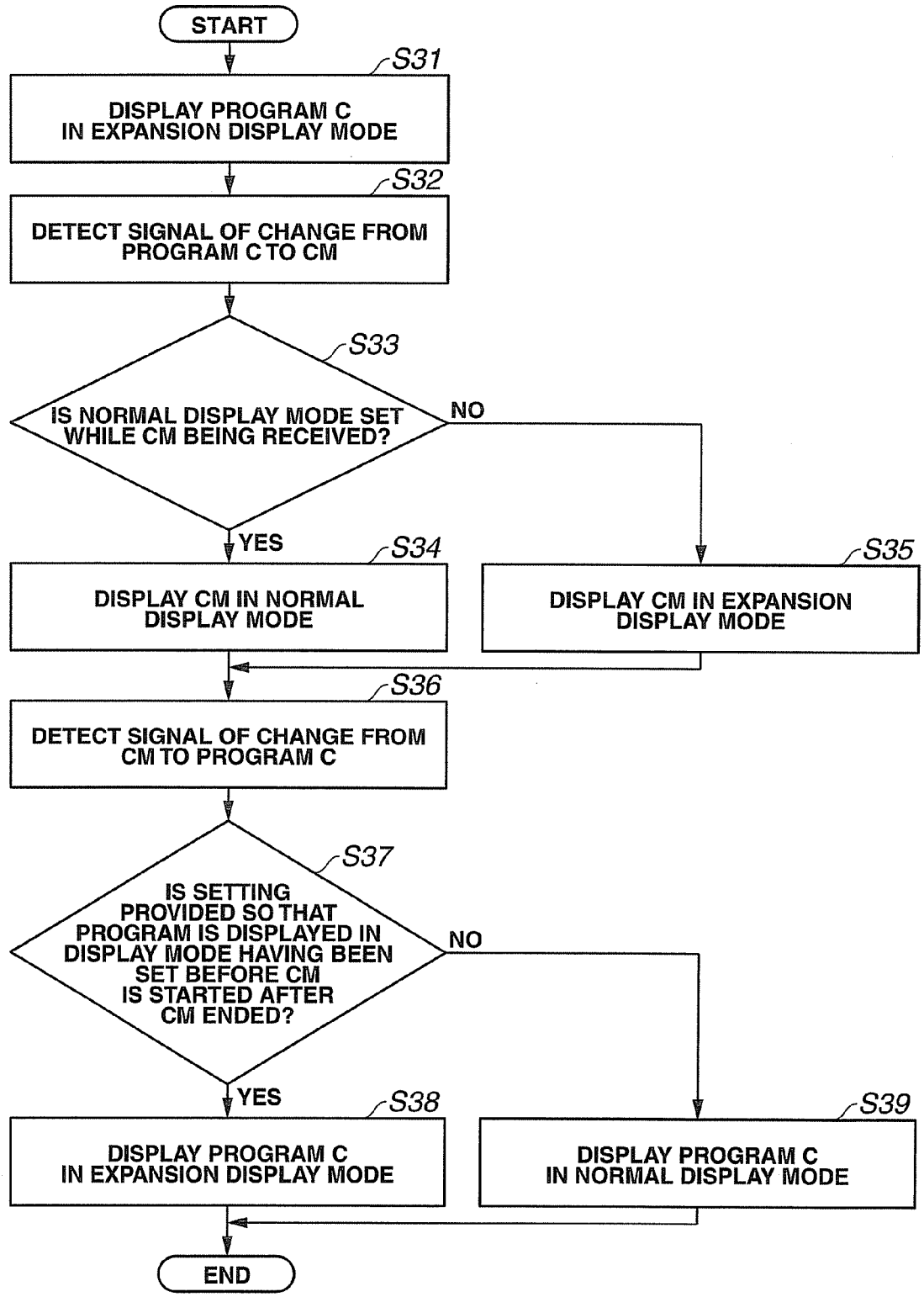

IMAGE DISPLAY DEVICE FOR EXPANDING AND DISPLAYING PART OF AN IMAGE

CROSS-REFERENCE TO RELATED APPLICATION

This application is based upon and claims the benefit of priority from the prior Japanese Patent Application No. 2006-224655 filed on Aug. 21, 2006; the entire contents of which are incorporated herein by reference.

BACKGROUND OF THE INVENTION

1. Field of the Invention

The present invention relates to an image display device, and in particular, to an image display device having a function of expanding and displaying part of an image.

2. Description of Related Art

There has been hitherto provided a digital broadcast receiver with a function of displaying a slave screen in part of a display screen and of independently displaying images on the slave screen and a master screen in an area except the slave screen respectively, that is to say, with a Picture-In-Picture function (hereinafter referred to as "PinP function").

Using the PinP function enables different images to be displayed on one screen by displaying, for example, an image of a program broadcasted from one television broadcasting station on a master screen and an image of a program broadcasted from the other television broadcasting station on a slave screen at the same time. Specifically, displaying a television drama on the master screen and a relay of a baseball game on the slave screen allows a viewer to simultaneously watch two different broadcast programs, for instance, to watch mainly a drama while confirming the progress of baseball game.

However, as described above, the PinP function is a function to display two different received images on one screen at the same time, so that the function has such a problem that part of one received image displayed on the master screen cannot be expanded and displayed on the slave screen.

Japanese Patent Laid-Open No. 2002-142171, for example, proposes an image display device, as a device for solving this problem, in which an arbitrary partial area is segmented from one received image displayed on the master screen (hereinafter referred to as "original image"), enlarged, synthesized with the original image and displayed on one screen. According to the proposal described in Japanese Patent Laid-Open No. 2002-142171, since an original image can be displayed on the master screen and an arbitrary partial area of the original image can be expanded and displayed on the slave screen, for example, when a viewer desires to confirm expanded scores and counts displayed at the lower corners of a screen while watching a relay of a baseball game, a relay of a baseball game can be displayed on the master screen and scores and counts can be expanded and displayed on the slave screen.

According to the proposal described in Japanese Patent Laid-Open No. 2002-142171, however, the slave screen is stationarily arranged at a location where the slave screen is superimposed on the expanded area in the original image displayed on the master screen, so that the part where the viewer wants to watch sometimes cannot be watched. Although the device is configured so that an expanded area is set and a slave screen can be displayed by the viewer operating a remote controller, once the expanded area and slave screen are set, their contents are held as long as the viewer does not change the set contents, so that the viewer has to set the change of the expanded area and the termination of expansion display in each case, which is time-consuming and is not user friendly.

BRIEF SUMMARY OF THE INVENTION

An image display device according to one embodiment of the present invention includes an image generating unit configured to generate images based on received digital signals, an image segmenting unit configured to extract the image signals included in a segment area being an arbitrary area portion from the image signals outputted from the image generating unit, a display area setting unit configured to set a display area being an arbitrary area portion displaying the extracted image signals, an image expanding unit configured to allocate the extracted image signals to the display area and generate an expanded image, and an image synthesizing unit configured to synthesize the image signals outputted from the image expanding unit and image signals outputted from the image generating unit.

BRIEF DESCRIPTION OF THE DRAWINGS

FIG. 3 is a flow chart illustrating steps of a viewer setting an expanded image displayed on the slave screen, according to the first embodiment of the present invention;

FIG. 4B is a picture illustrating an image displayed on the monitor in setting a segment area;

FIG. 4C is a picture illustrating the image displayed on the monitor in setting a display area;

FIG. 4D is a picture illustrating the image displayed on the monitor after the master and the slave screen are synthesized;

FIG. 5B is a chart illustrating one example of a picture quality adjusting menu;

FIG. 5C is a chart illustrating one example of an image displayed on the monitor after its picture quality has been adjusted;

FIG. 6 is a flow chart illustrating steps for how to automatically switch an expansion display mode and a normal display mode as a program is started and ended respectively;

FIG. 7 is a flow chart illustrating steps of how to automatically switch expansion display mode and normal display mode when a commercial message is started and finished respectively;

FIG. 9B is a picture illustrating an image displayed on the monitor immediately after an expanded image has been set;

FIG. 9C is a picture illustrating an image displayed on the monitor when the image in the segment area has moved.

DETAILED DESCRIPTION OF THE INVENTION

The embodiments of the present invention are described below with reference to the drawings.

First Embodiment

Figure 1:
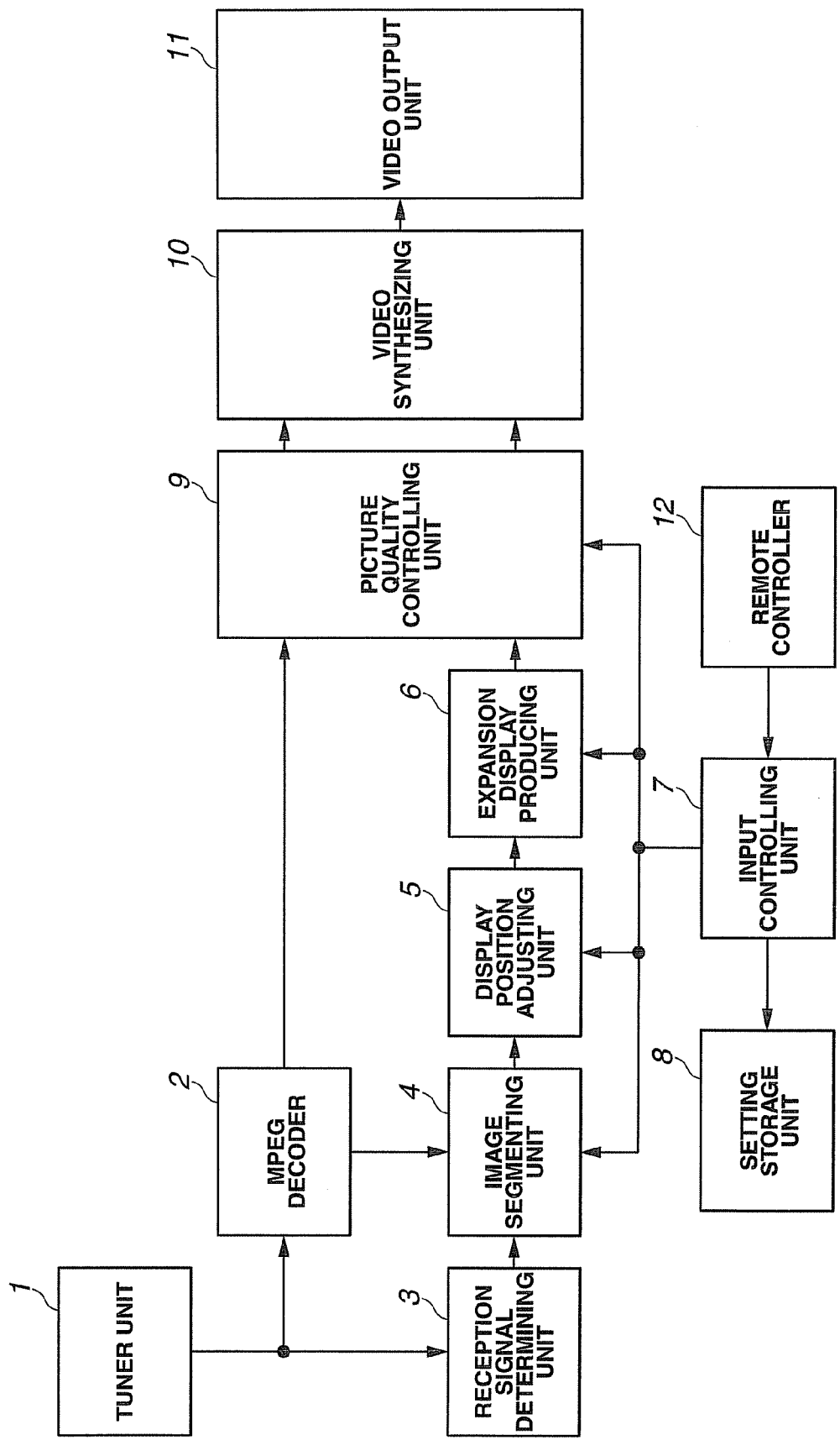
FIG. 1 is a schematic block diagram illustrating the configuration of an image display device according to a first embodiment of the present invention.

The configuration of an image display device according to a first embodiment of the present invention is described using FIG. 1. FIG. 1 is a schematic block diagram illustrating the configuration of the image display device according to the first embodiment of the present invention.

The image display device in the present embodiment includes a tuner unit 1 configured to receive digital broadcast signals inputted from an antenna (not shown). Since the digital broadcast signals received by the tuner unit 1 have been MPEG-coded, the signals are outputted to an MPEG decoder 2 being an image generating unit and decoded therein. The MPEG-coded digital broadcast signals are also outputted to a reception signal determining unit 3 being a signal determining unit. The reception signal determining unit 3 determines the start and end of a program and a commercial message from the received digital broadcast signal and outputs determination results. An electronic program guide (EPG), for example, is used for the determination.

Signals outputted from the MPEG decoder 2 (or, image signals forming the original images) and determination signals outputted from the reception signal determining unit 3 are inputted into an image segmenting unit 4. The image segmenting unit 4 sets an area where images are expanded and displayed on the slave screen as a segment area from the original image based on the signal outputted from the MPEG decoder 2. A predetermined area set into a setting storage unit 8 may be used as a segment area or a viewer may set an arbitrary area as a segment area using a remote controller 12. Information stored in the setting storage unit 8 and information set by the remote controller 12 are inputted into units such as the image segmenting unit 4 and others through an input controlling unit 7.

Figure 2:
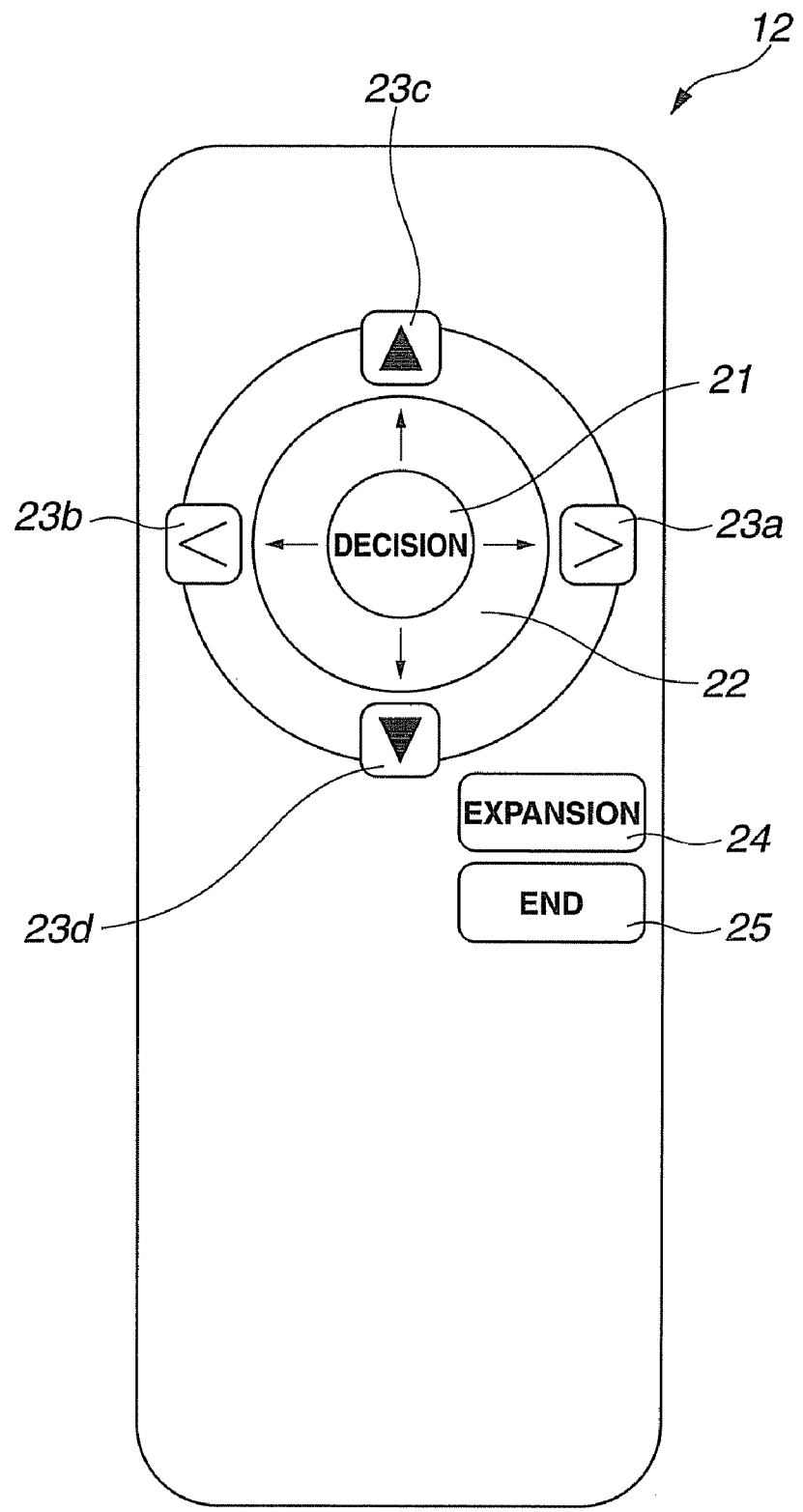
FIG. 2 is a schematic diagram illustrating one example of a remote controller 12.

As illustrated in FIG. 2, the remote controller 12 includes, for example, various buttons 21 to 25 arranged thereon. Depressing the buttons 21 to 25 enables the segment area or a display area described later to be set. FIG. 2 is a schematic diagram showing one example of the remote controller 12. The following is a description of functions allocated to the buttons. A substantially circular decision button 21 arranged at the center of the remote controller 12 has a function of notifying the input controlling unit 7 of the completion of setting the segment area or the display area described later.

An annular magnification changing button 22 arranged so as to surround the decision button 21 is used to change the size of the segment area or the display area. Depressing a part indicated by an upward arrow allows increasing upward or downward the length (height) of the segment area or the display area set at that point in time. On the contrary, depressing a part indicated by a downward arrow allows decreasing the height of the segment area or the display area. Depressing a part indicated by a rightward arrow allows increasing leftward and rightward the length (width) of the segment area or the display area set at that point in time. On the contrary, depressing a part indicated by a leftward arrow allows decreasing the width of the segment area or the display area.

Shift buttons 23*a* to 23*d* arranged in four places around the magnification changing button 22 are used to change the position of the segment area or the display area. Depressing the shift button 23*a* enables the position of the segment area or the display area to be shifted more rightward than the position set at that point in time. Similarly, depressing the shift buttons 23*b*, 23*c* and 23*d* enables the position of the segment area or the display area to be shifted more leftward, upward or downward than the position set at that point in time respectively.

An expansion button 24 arranged at a lower right portion of the shift button 23*d* has a function of notifying the input controlling unit 7 of the start of setting an expanded image displayed on the slave screen. Depressing the expansion button 24 sets a segment area to the size and position stored in the setting storage unit 8. An end button 25 arranged at the lower portion of the expansion button 24 has a function of notifying the input controlling unit 7 of the end of setting an expanded image displayed on the slave screen.

Image information in the segment area set by the image segmenting unit 4 is outputted to a display position adjusting unit 5 being a display area setting unit. The display position adjusting unit 5 expands images in the segment area and sets a display area to be displayed on a monitor (not shown). That is to say, the display position adjusting unit 5 sets the size and the position of the slave screen arranged superposedly on the master screen on which the original image is displayed. A predetermined area set into a setting storage unit 8 may be used as the display area or a viewer may set an arbitrary area as the display area using a remote controller 12.

The display area set by the display position adjusting unit 5 and the segment area set by the image segmenting unit 4 are outputted to an expansion display producing unit 6 being an image expanding unit. The expansion display producing unit 6 produces expanded images so that images in the segment area are allocated to the entire area designated as a display area. The expanded image produced by the expansion display producing unit 6 and the original image based on the signal outputted from the MPEG decoder 2 are inputted into a picture quality controlling unit 9 to be subjected to adjustment in contrast, brightness and tone, and thereafter outputted to a video synthesizing unit 10.

Figure 5A:
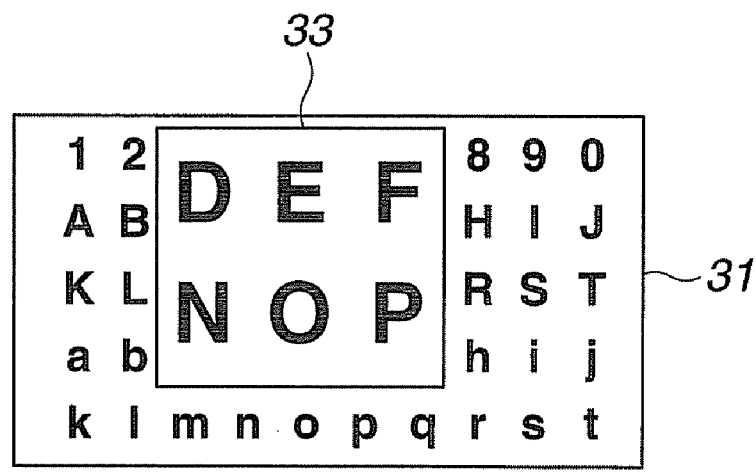
FIGS. 5A to 5C are charts illustrating a method of adjusting picture quality of the slave screen and FIG. 5A is a chart illustrating one example of an image displayed on the monitor before its picture quality is adjusted.
Figure 5B:
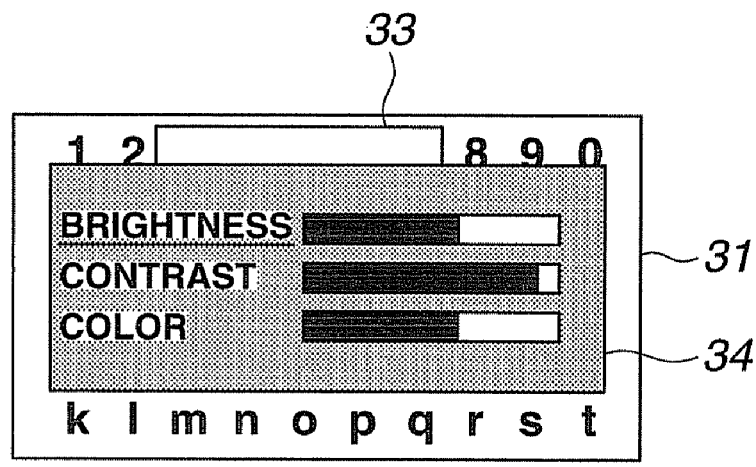
Figure 5C:
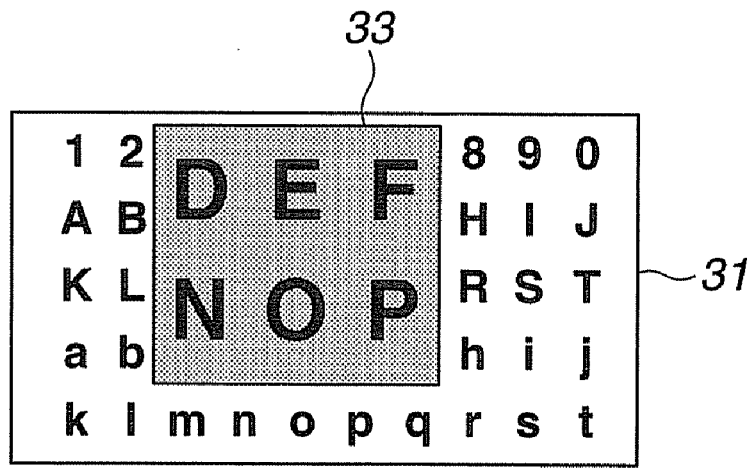

As illustrated in FIG. 5A, for example, if only the picture quality of the slave screen is desired to be adjusted while an expanded image is displayed on the slave screen superimposed on the master screen, a picture quality adjusting menu is displayed on a monitor (not shown) as illustrated in FIG. 5B and a viewer adjusts picture quality to suit its taste using the remote controller 12, thereby enabling displaying an image with only the slave screen lowered in contrast, for example, as illustrated in FIG. 5C. FIGS. 5A to 5C are charts illustrating a method of adjusting picture quality of the slave screen. FIG. 5A is a chart illustrating one example of an image displayed on the monitor before its picture quality is adjusted. FIG. 5B is a chart illustrating one example of a picture quality adjusting menu. FIG. 5C is a chart illustrating one example of an image displayed on the monitor after its picture quality has been adjusted.

The video synthesizing unit 10 synthesizes the original and expanded images of which the picture quality is adjusted and outputs the synthesized image to a monitor (not shown) through a video output unit 11 to be displayed thereon.

Figure 4A:
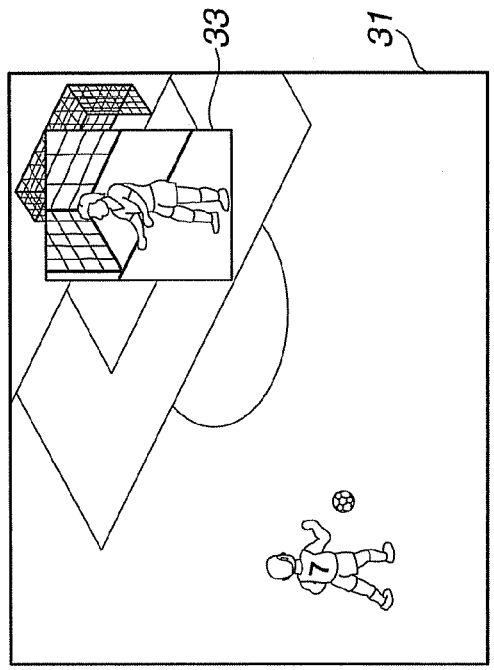
FIGS. 4A to 4D are pictures illustrating images displayed on a monitor in setting the expanded image and FIG. 4A is a picture illustrating an original image 31.
Figure 4C:
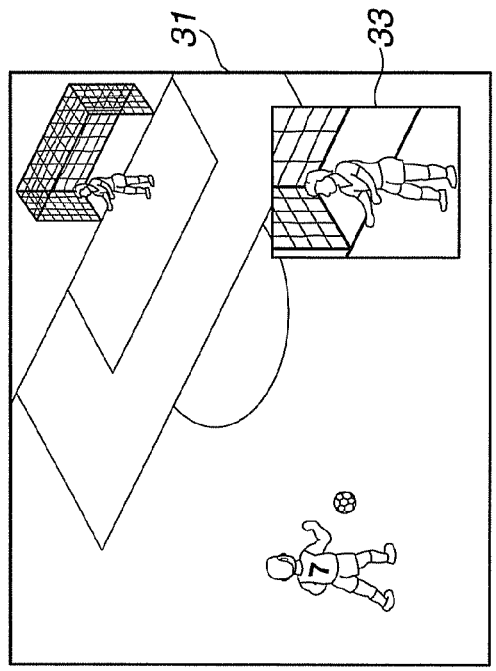
Figure 4B:
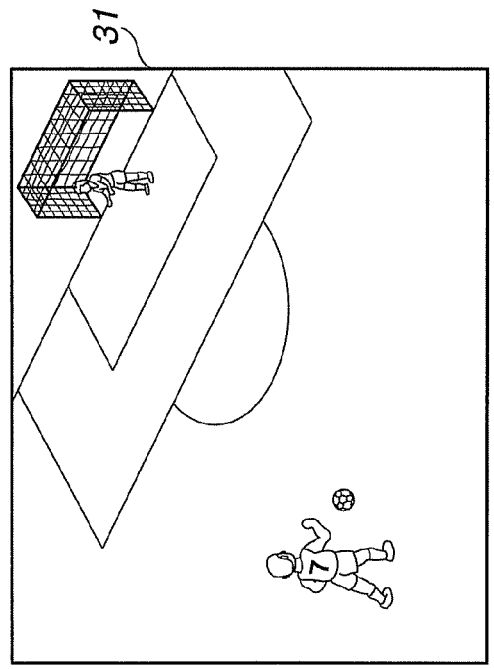
Figure 4D:
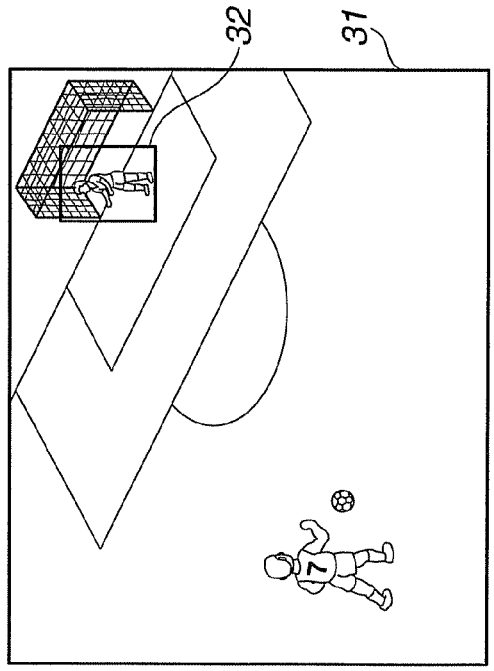

The following is a detailed description of a method of a viewer setting an expanded image displayed on the slave screen using the remote controller 12 in the foregoing image display device with reference to FIG. 3 and FIGS. 4A to 4D. FIG. 3 is a flow chart illustrating steps of a viewer setting an expanded image displayed on the slave screen, according to the first embodiment of the present invention. FIGS. 4A to 4D are pictures illustrating images displayed on a monitor in setting the expanded image. FIG. 4A is a picture illustrating an original image 31. FIG. 4B is a picture illustrating an image displayed on the monitor in setting a segment area. FIG. 4C is a picture illustrating the image displayed on the monitor in setting a display area. FIG. 4D is a picture illustrating the image displayed on the monitor after the master and the slave screen are synthesized.

At step S1, a viewer depresses the expansion button 24 of the remote controller 12 with an image displayed as illustrated in FIG. 4A to cause the monitor to display an expansion area frame 32. Then, the monitor displays the expansion area frame 32, for example, in an upper right portion of the original image as illustrated in FIG. 4B. The area surrounded by the expansion area frame 32 corresponds to a segment area. Changing the size and position of the expansion area frame 32 at the following steps permits setting the area of an image desired to be expanded and displayed on the slave screen. The expansion area frame 32 is displayed according to the default value of the size and position stored in the setting storage unit 8.

Incidentally, a viewer may change the default value of the size and position of the expansion area frame 32 to an arbitrary value. If an expanded image is set after a viewer has changed the default value, the expansion area frame 32 is displayed on the monitor using the changed default value.

The viewer may register an arbitrary value as a custom value in the setting storage unit 8 in addition to the default value. In that case, at step S1, depressing the expansion button 24 of the remote controller 12 displays a menu on the monitor which causes a viewer to select either the default value or the custom value according to which the expansion area frame 32 is displayed thereon. Thus, the expansion area frame 32 can be displayed on the monitor according to the selected value.

At step S2, the viewer changes the size of the expansion area frame 32 using the magnification changing button 22 of the remote controller 12 while viewing the monitor so that the expansion area frame 32 is equal in size to an image area desired to be expandedly displayed on the slave screen.

At step S3, the viewer changes the position of the expansion area frame 32 using the shift buttons 23a to 23d of the remote controller 12 while viewing the monitor so that the position of the expansion area frame 32 coincides with the position of an image area desired to be expandedly displayed on the slave screen.

At step S4, a determination is made as to whether the size and position of the expansion area frame 32 completely coincide with those of the image area desired to be expandedly displayed on the slave screen. The viewer determines this while viewing the monitor. If the viewer determines that the size and position of the expansion area frame 32 do not completely coincide with those of the image area and therefore need to be changed, the process returns to the step S2 to continuously set the expansion area frame 32. On the other hand, if the viewer determines that the size and position of the expansion area frame 32 completely coincide with those of the image area and the setting of the expansion area frame 32, i.e., that of the segment area has been completed, the process advances to step S5.

At step S5, the viewer depresses the decision button 21 of the remote controller 12 to cause the monitor to display a display area frame 33 thereon. Then, the display area frame 33 is displayed on the monitor as illustrated in FIG. 4C at the same position as the expansion area frame 32 determined at step S4, for example. The area surrounded by the display area frame 33 corresponds to the display area of the slave screen. Changing the size and position of the display area frame 33 at the following steps permits setting the magnification of an image displayed on the slave screen and the display position of the slave screen.

The display area frame 33 is of a size that the expansion area frame 32 is expanded based on a magnification according to the default value stored in the setting storage unit 8. The display area frame 33 is also displayed at a position according to the default value stored in the setting storage unit 8. The default value for the display area frame 33 can be changed by the viewer as is the case with the default value of the expansion area frame 32. The custom value in addition to the default value may be registered in the setting storage unit 8 as is the case with that of the expansion area frame 32.

Although the image inside the expansion area frame 32 is expanded and displayed inside the display area frame 33 in FIG. 4C, the expanded image displayed inside the frame may be translucently displayed or displayed plain or solid black instead of displaying the expanded image inside the frame for clear distinction from the original image.

In the next place, at step S6, a determination is made as to whether the size of the display area frame 33 completely coincides with the size that the image desired to be expandedly displayed on the slave screen (the image inside the expansion area frame 32) is expanded at a desired magnification. The viewer determines this while viewing the monitor. If the viewer determines that the size of the display area frame 33 does not completely coincide with the size mentioned above and therefore needs to be changed, the process advances to the step S7 to set the display area frame 33.

At step S7, the viewer changes the size of the display area frame 33 using the magnification changing button 22 of the remote controller 12 while viewing the monitor so that the size of the display area frame 33 equals to the size that the image desired to be expandedly displayed on the slave screen (or the image inside the expansion area frame 32) is expanded at a desired magnification. On the other hand, it is determined the size of the display area frame 33 completely coincides with the size that the image desired to be expandedly displayed on the slave screen (or the image inside the expansion area frame 32) is expanded at a desired magnification, the process advances to step S8.

At step S8, a determination is made as to whether the position of the display area frame 33 completely coincides with the position where the slave screen desired to be displayed. The viewer determines this while viewing the monitor. If the viewer determines that the position of the display area frame 33 does not completely coincide with the position stated above and therefore needs to be changed, the process advances to step S9 to set the display area frame 33.

At step S9, the viewer changes the position of the display area frame 33 using the shift buttons 23a to 23d of the remote controller 12 while viewing the monitor so that the position of the display area frame 33 meets the position where the slave screen is desired to be displayed. On the other hand, if the position of the display area frame 33 completely coincides with the position where the slave screen is desired to be displayed, it is determined that the setting of display area of the slave screen is completed, the process proceeds to step S10.

At step S10, the viewer depresses the decision button 21 of the remote controller 12 to terminate the setting of display area of the slave screen. Thus, the image inside the expansion area frame 32 set at steps S1 to S5 is expanded and displayed on the monitor as illustrated in FIG. 4D inside the display area frame 33, i.e., inside the display area of the slave screen set at steps S6 to S10 with the image superimposed on the master screen on which the original image 31 is displayed. At step S11, the viewer depresses an end button 25 of the remote controller 12 to terminate the setting of the slave screen to return to the normal display mode.

Thus, in the present embodiment, the viewer can arbitrarily set the slave screen, specifically, the size and position of the display area frame 33 to an arbitrary size and position when setting an expanded image superimposed and displayed on the master screen, which enables the viewer to display the slave screen at an arbitrary position where the viewer desires.

In addition, the default value defining the initial size and position of the expansion area frame 32 and the display area frame 33 used when the slave screen is set are stored in the setting storage unit 8. The default value can be changed to an arbitrary value and registered, so that the setting of the slave screen which the viewer is fond of is registered in advance as the default value to reduce the time required for the viewer to set the slave screen and improve user friendliness.

Incidentally, in the present embodiment stated above, although an MPEG-coded digital broadcast signal is used as a digital broadcast signal inputted into the image display device, a signal coded by other moving image compression standards such as, for example, H.264 may be used.

Second Embodiment

In the next place, an image display device according to the second embodiment of the present invention is described. The image display device of the present embodiment is the same in configuration as that of the first embodiment described using FIG. 1, so that the same constituent elements are denoted by the same reference numeral and characters respectively and thus repetitive description thereof will be omitted.

The image display device of the present embodiment has a function of automatically switching from an expansion display mode to a normal display mode (or, only the original image is displayed on the master screen without the slave screen) as a program or commercial message starts and ends in addition to the function of the image display device of the first embodiment. That is to say, the present embodiment enables reducing the time required for a viewer to switch the expansion display mode and the normal display mode and further improving user friendliness.

The following is a detailed description of a method of automatically switching the expansion display mode and the normal display mode according to the start and end of a program in the image display device of the present embodiment with reference to FIG. 6. FIG. 6 is a flow chart illustrating steps for how to automatically switch the expansion display mode and the normal display mode according to the start and end of a program.

At step S21, a program A is expanded and displayed on the monitor. Incidentally, specific steps for expansion and display, that is to say, specific steps for producing an expanded image in which part of the original image displayed on the master screen is expanded and displayed on the slave screen and being displayed superposedly on the master screen are the same as the steps described in the first embodiment using the flow chart in FIG. 3.

At step S22, the reception signal determining unit 3 detects that signals received by the tuner unit 1 have changed from broadcast signals of a program A to those of a program B. At step S23, a determination is made as to whether the setting is provided so that the expansion display mode is automatically changed to the normal display mode when a program is changed over.

Incidentally, the viewer can set whether the display mode is automatically switched according to the changeover of a program at an arbitrary timing. For example, a display mode changing menu is displayed on a monitor (not shown) to allow providing the setting suiting viewer's taste using the remote controller 12. The setting whether the expansion display mode is automatically switched to the normal display mode according to the changeover of a program is stored in the setting storage unit 8 from the remote controller 12 through the input controlling unit 7. A determination at step S23 is made based on the above setting contents stored in the setting storage unit 8.

At step S23, if it is determined that the setting is provided so that the expansion display mode is automatically switched to the normal display mode according to the changeover of a program, the process advances to step S24 to display a program B on the monitor in the normal display mode. That is to say, at step S24, the output of the video synthesizing unit 10 is changed to selectively output only the image signal from the MPEG decoder 2. On the other hand, at step S23, if it is determined that setting is provided so that the expansion display mode is not switched to the normal display mode even if a program is changed over, the process advances to step S25 to cause the monitor to display the program B in the expansion display mode. In this case, the same setting contents used in the expansion display mode for the program A are used as those related to the expansion display mode such as the size and position of the segment area in the original image and the size and position of the slave screen.

The following is a detailed description of a method of automatically switching the expansion display mode and the normal display mode according to the start and end of a commercial message in the image display device of the present embodiment with reference to FIG. 7. FIG. 7 is a flow chart illustrating steps for how to automatically switch the expansion display mode and the normal display mode according to the start and end of a commercial message.

At step S31, a program C is expanded and displayed on the monitor. Incidentally, specific steps for expansion and display, that is to say, specific steps for producing an expanded image in which part of the original image displayed on the master screen is expanded and displayed on the slave screen and being displayed superposedly on the master screen are the same as the steps described in the first embodiment using the flow chart in FIG. 3.

At step S32, the reception signal determining unit 3 detects that signals received by the tuner unit 1 have changed from broadcast signals of a program C to those of a commercial message. At step S33, a determination is made as to whether the setting is provided so that commercial message broadcast signals are displayed in the normal display mode while they are received. Incidentally, the viewer can set a display mode in a commercial message broadcast at an arbitrary timing. A display mode in a commercial message broadcast can be set, for example, similarly to the setting of automatic switch of a display mode according to the changeover of a program. The setting contents are stored in the setting storage unit 8. A determination at step S33 is made based on the above setting contents.

At step S33, if it is determined that the setting is provided so that commercial message broadcast signals are displayed in the normal display mode while they are received, the process advances to step S34 to cause the monitor to display a commercial message in the normal display mode. In other words, at step S34, the output of the video synthesizing unit 10 is changed to selectively output only the image signal from the MPEG decoder 2. On the other hand, at step S33, if it is determined that the setting is provided to continue the expansion display mode even while commercial message broadcast signals are received, the process proceeds to Step S35 to cause the monitor to display the commercial message in the expansion display mode. In this case, the same setting contents used in the expansion display mode for the program C are used as those related to the expansion display mode such as the size and position of the segment area in the original image and the size and position of the slave screen.

At step S36, the reception signal determining unit 3 detects that signals received by the tuner unit 1 have changed from broadcast signals of a commercial message to those of a program C. At step S37, a determination is made as to whether a display mode after the end of a commercial message is set to succeed a display mode before the start of a commercial message. Incidentally, the viewer can set a display mode after the end of a commercial message at an arbitrary timing, for example, similarly to the setting of automatic switch in a display mode according to the changeover of a program. The setting contents are stored in the setting storage unit 8. A determination at step S37 is made based on the above setting contents.

At step S37, if it is determined that a display mode after the end of a commercial message is set to succeed a display mode before the start of a commercial message, the process proceeds to step S38 to cause the monitor to display the program C in the expansion display mode. In this case, the same setting contents used in the expansion display mode of the program C before the start of a commercial message are used as those related to the expansion display mode such as the size and position of the segment area in the original image and the size and position of the slave screen. On the other hand, at step S37, if it is determined that a display mode after the end of a commercial message is set not to succeed a display mode before the start of a commercial message, the process proceeds to step S39 to cause the monitor to display the program C in the normal display mode. In other words, at step S39, the output of the video synthesizing unit 10 is changed to selectively output only the image signal from the MPEG decoder 2.

Thus, in the present embodiment, the expansion display mode can be automatically switched to the normal display mode at the start and end of a program and commercial message by a viewer setting in advance whether the expansion display mode is switched to the normal display mode according to the start and end of a program and commercial message in the setting storage unit 8, which reduces the time required for a viewer to operate the device and further improves user friendliness.

Third Embodiment

An image display device according to the third embodiment of the present invention is described. The image display device of the present embodiment is the same in configuration as that of the first embodiment described using FIG. 1, so that the same constituent elements are denoted by the same reference numeral and characters respectively and thus repetitive description thereof will be omitted.

The image display device of the present embodiment has a function of detecting a moving image, in addition to the function of the image display device of the first embodiment, or a function of automatically moving the segment area as an image in the segment area moves to always display the image initially set in the segment area on the slave screen. That is to say, in the present embodiment, when an image desired for the viewer to be expanded and displayed moves, the segment area is caused to automatically follow the image, thereby reducing the time required for the viewer to reset the segment area and further improving user friendliness.

Figure 8:
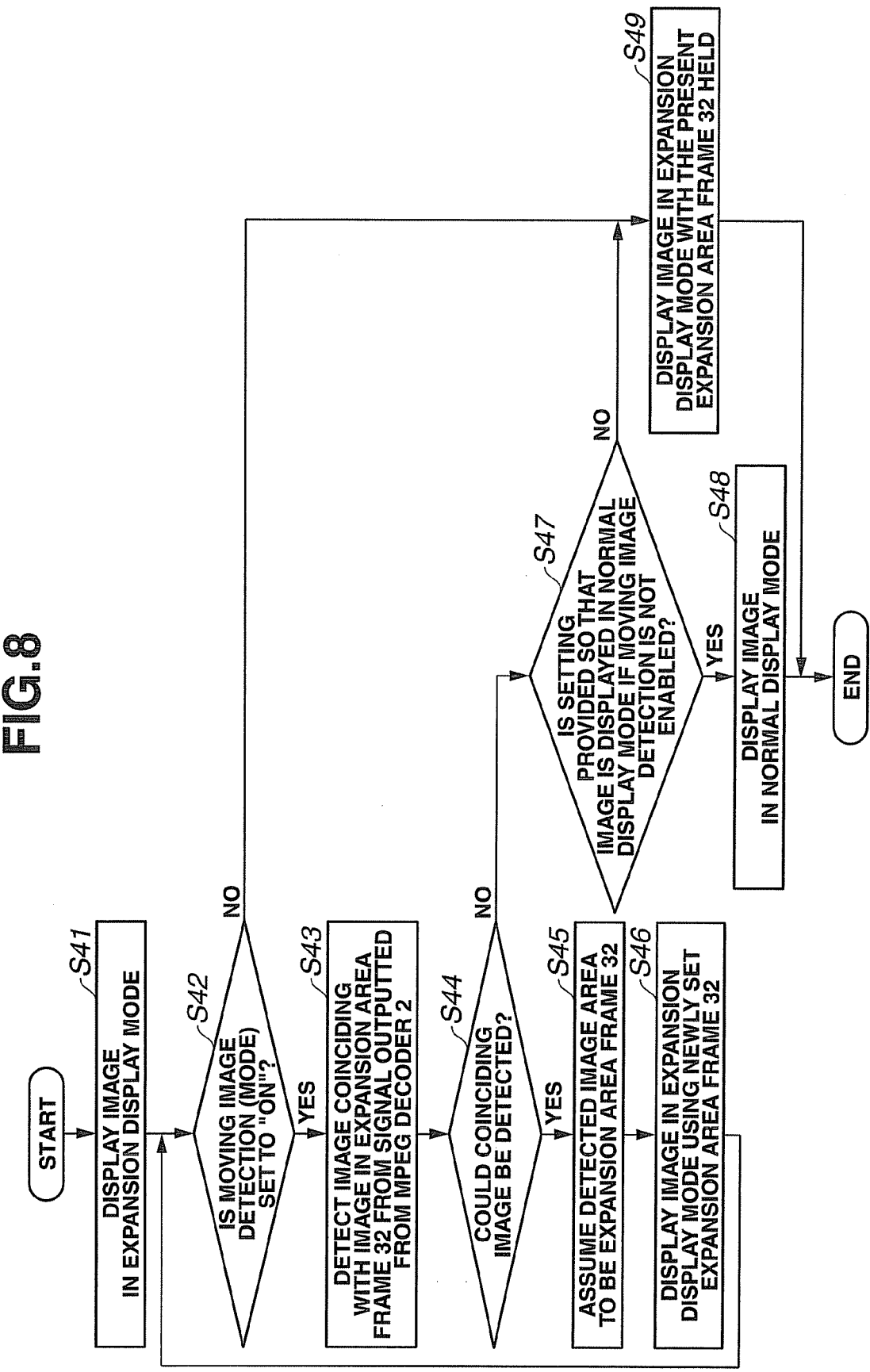
FIG. 8 is a flow chart illustrating steps of the expansion display mode for the case where an image in a segment area moves.
Figure 9A:
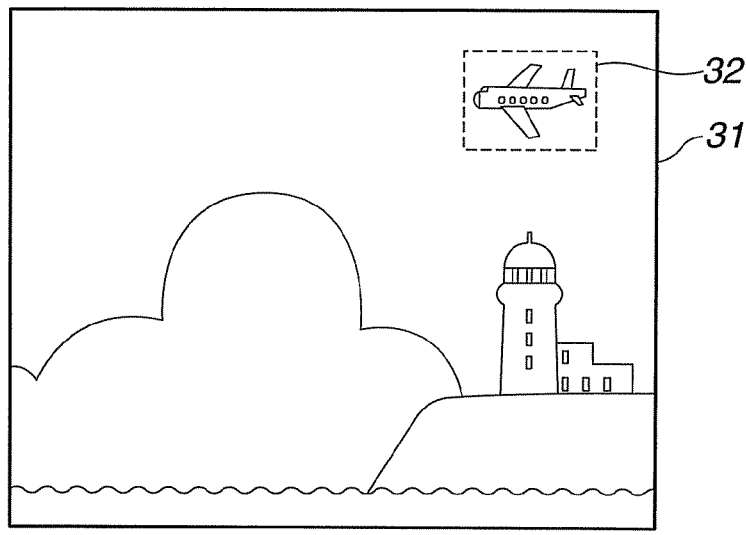
FIGS. 9A to 9C are pictures illustrating images displayed on a monitor when expanded images are set and displayed and FIG. 9A is a picture illustrating an image displayed on the monitor in setting a segment area.
Figure 9B:
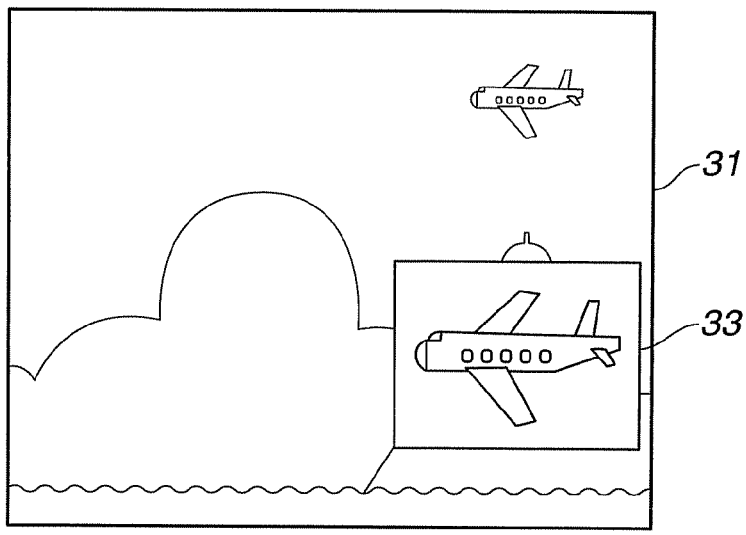
Figure 9C:
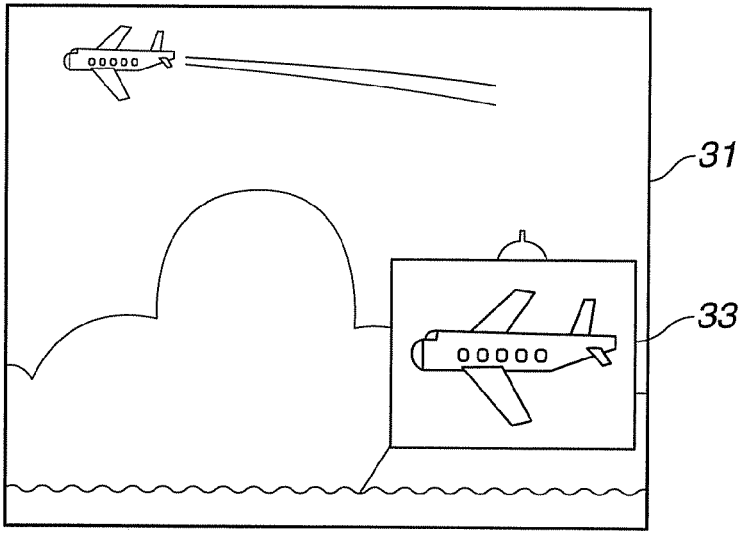
Figure 10:
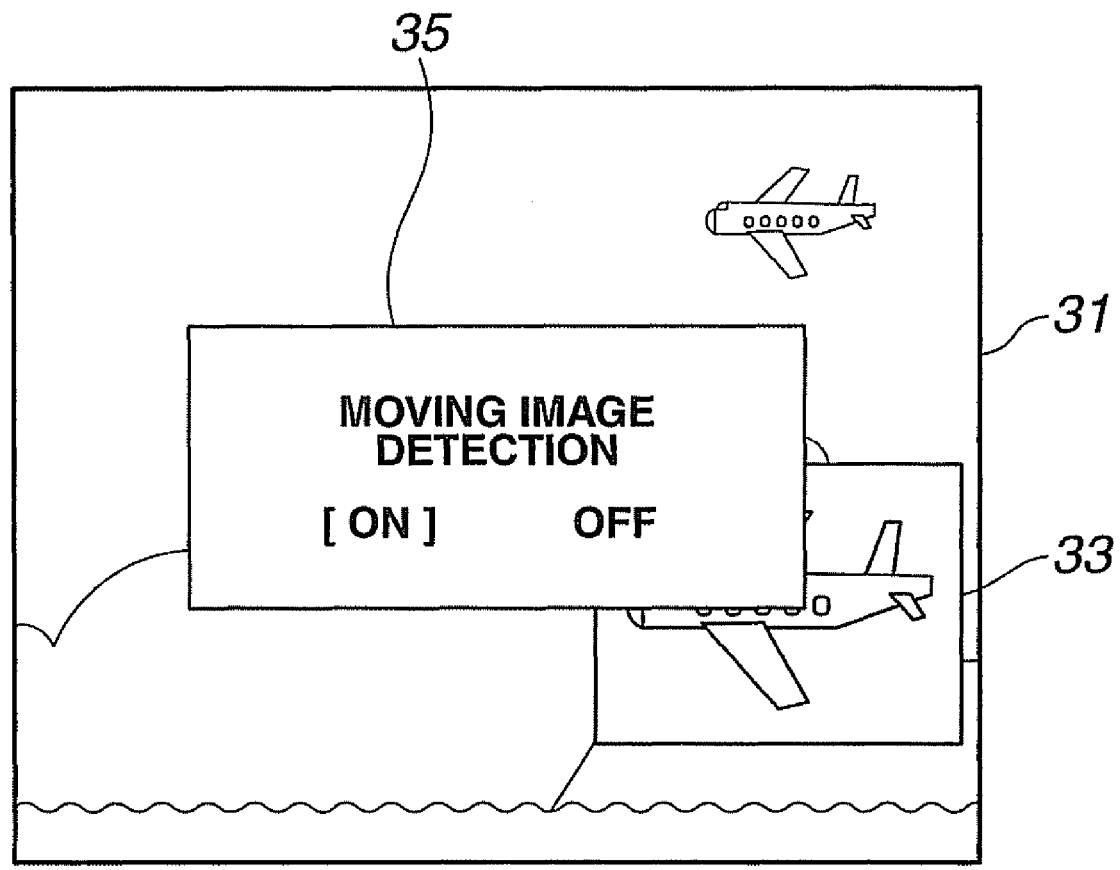
FIG. 10 is a picture illustrating one example of a moving image detection setting menu screen for setting an expansion display method for the case where the image in the segment area moves.

The following is a detailed description of a method of expansion and display for the case where images move in the segment area in the image display device of the present embodiment with reference to FIGS. 8 to 10. FIG. 8 is a flow chart illustrating steps of the expansion display mode for the case where an image in a segment area moves. FIGS. 9A to 9C are pictures illustrating images displayed on a monitor when expanded images are set and displayed. FIG. 9A is a picture illustrating an image displayed on the monitor in setting a segment area. FIG. 9B is a picture illustrating an image displayed on the monitor immediately after an expanded image has been set. FIG. 9C is a picture illustrating an image displayed on the monitor when the image in the segment area has moved. FIG. 10 is a picture illustrating one example of a moving image detection setting menu screen for setting an expansion display method for the case where the image in the segment area moves.

At step S41, an image is expanded and displayed on the monitor. Incidentally, specific steps for expansion and display, that is to say, specific steps for producing an expanded image in which part of the original image displayed on the master screen is expanded and displayed on the slave screen and being displayed superposedly on the master screen are the same as the steps described in the first embodiment using the flow chart in FIG. 3. It is assumed herein that the expansion display mode is set so that the image in the expansion area frame 32 illustrated in FIG. 9A is expanded and displayed as an expanded image in the display area frame 33 at the lower right portion of the monitor as illustrated in FIG. 9B.

At step S42, a determination is made as to whether a moving image detection mode is set to "ON" in the expansion display mode. Incidentally, a moving image detection mode in the expansion display mode can be set to either of "ON" or "OFF." The moving image detection mode is set to "ON" for the case where the expanded image is produced while the expansion area frame 32 is automatically moved to follow the move of an image when an image in the expansion area frame 32 at the time of setting the expanded image moves in the expansion display mode and the expanded image is displayed in the display area frame 33. On the other hand, the moving image detection mode is set to "OFF" for the case where the expanded image is produced with the position of the expansion area frame 32 always fixed and displayed in the display area frame 33.

The viewer can set the moving image detection mode at an arbitrary timing. That is to say, for example, a moving image detection setting menu 35 illustrated in FIG. 10 is displayed on a monitor (not shown) to cause the viewer to select either of "ON" or "OFF" of its favorite mode using the remote controller 12 and the selected mode can be stored in the setting storage unit 8. In other words, the determination at step S42 is made based on the moving image detection mode stored in the setting storage unit 8.

At step S42, if it is determined that the moving image detection mode is set to "OFF," the process proceeds to step S49, where the expanded image is produced with the position of the expansion area frame 32 fixed and displayed in the display area frame 33. That is to say, when an image in the expansion area frame 32 varies with the passage of time, the image displayed in the display area frame 33 (or, the image on the slave screen) also varies.

On the other hand, at step S42, if it is determined that the moving image detection mode is set to "ON," the process proceeds to step S43, where an image coinciding with an image in the expansion area frame 32 at the time of setting the expanded image is detected from a signal output by the MPEG decoder 2. A pattern matching method, for example, is used to detect a coinciding image.

At step S44, if a coinciding image is detected as a result of detecting an image at step S43, the process proceeds to step S45, the expansion area frame 32 is reset so as to include the detected image. At step S46, an expanded image is produced using the expansion area frame 32 to be displayed in the display area frame 33.

For example, as illustrated in FIG. 9A, an image area including an airplane at the upper right corner of the monitor is set to be the expansion area frame 32 and the moving image detection mode is set to "ON." When the airplane moves leftward on the monitor with the passage of time, the position of the expansion area frame 32 also follows the move of the airplane to move from the upper right corner to the upper left corner of the monitor. Then, as illustrated in FIG. 9C, an expanded image of the airplane is always displayed in the display area frame 33 set at the lower right portion of the monitor. On the other hand, if the moving image detection mode is set to "OFF," the position of the expansion area frame 32 is fixed and therefore an image in the expansion area frame 32 initially set at the upper right corner of the monitor is displayed in the display area frame 33, so that, when the airplane moves away outside the expansion area frame 32, for instance, the sky and clouds being the background of the airplane will be displayed as an expanded image.

The series of steps from the setting of moving image detection mode to the detection of moving image and the production of the expanded image at steps S42 to S46 are repetitively executed until the moving image detection mode is set to "OFF" or a moving image detection is not enabled.

At step S44, if a coinciding image cannot be detected as a result of detecting an image at step S43, or if it is determined that a moving image detection is not enabled, the process proceeds to step S47. For example, if an image in FIG. 9C is displayed on the monitor and the airplane displayed at the upper left corner further moves away and disappears from the monitor, it is determined that a moving image detection is not enabled.

At step S47, a determination is made as to the setting of a display method if a moving image detection is not enabled. If a moving image detection is not enabled, any of the following methods can be selected, for example: one method in which the expansion display mode is terminated to switch to the normal display mode with the use of the master screen only; and the other method in which the position of the expansion area frame 32 set immediately before a moving image detection is not enabled is fixed and the expanded display is continued with the moving image detection mode set to "OFF." The viewer can set the display method at an arbitrary timing using the remote controller 12, for example, with the setting menu screen displayed on the monitor as is the case with the setting of the moving image detection mode. The setting values in this case are also stored in setting storage unit 8.

At step S47, if it is determined that the setting is provided so that the expansion display mode is terminated to switch to the normal display mode as a display method for the case where moving image detection is not enabled, the process proceeds to step S48 where the display mode in which the slave screen is superimposed on the master screen is switched to the normal display mode with the used of the master screen only. On the other hand, at step S47, it is determined that the setting is provided to continue the expansion display mode, the process proceeds to step S49, where an expanded image is produced with the position of the expansion area frame 32 fixed and displayed in the display area frame 33.

Thus, in the present embodiment, when an image desired for the viewer to be expanded and displayed moves, the segment area is caused to automatically follow the image, thereby reducing the time required for the viewer to reset the segment area and further improving user friendliness.

In the present embodiment, although the display position of the slave screen or the position of the display area frame 33 is fixed irrespective of the setting of the moving image detection mode, the position may be caused to follow the move of the expansion area frame 32 to move therewith. That is to say, if the expansion area frame 32 moves leftward, the position of the display area frame 33 also may be caused to move leftward, as a result, the slave screen is moved from the lower right portion to the lower left portion of the monitor with the passage of time.

As described above, according to the foregoing image display device related to the embodiments of the present invention, there is provided the image display device in which the slave screen can be displayed at an arbitrary position where the viewer wants and the time required for a viewer to operate the device can be reduced to improve user friendliness, for the case where part of the original image displayed on the master screen is expanded and superimposed on the original image as a slave screen.

What is claimed is:

1. An image display device comprising:
   an image generating unit configured to generate image signals based on received digital signals;
   an image segmenting unit configured to extract the image signals included in a segment area being an arbitrary area portion from the image signals outputted from the image generating unit;
   a display area setting unit configured to set a display area being an arbitrary area portion displaying the extracted image signals;
   an image expanding unit configured to allocate the extracted image signals to the display area and generate an expanded image;
   an image synthesizing unit configured to synthesize the image signals outputted from the image expanding unit and image signals outputted from the image generating unit; and
   a signal determining unit configured to determine information on a program during reception from the digital signals,
   wherein if it is determined by the signal determining unit that the program changes from one to a commercial message: if setting is provided so that only the image signal outputted from the image generating unit is selectively outputted, the output from the image synthesizing unit is changed so that only the image signal outputted from the image generating unit is selectively outputted; and if setting is not provided so that only the image signal outputted from the image generating unit is selectively outputted, image signals synthesized by image signals outputted from the image generating unit and the image signal outputted from the image expanding unit are outputted from the image synthesizing unit.

2. The image display device according to claim 1 further comprising a setting storage unit configured to store the segment area and the display area.

3. The image display device according to claim 1, wherein the size of the segment area can be changed by operating the operation button of a remote controller.

4. The image display device according to claim 1, wherein the position of the segment area can be changed by operating the operation button of a remote controller.

5. An image display device comprising:
- an image generating unit configured to generate image signals based on received digital signals;
- an image segmenting unit configured to extract the image signals included in a segment area being an arbitrary area portion from the image signals outputted from the image generating unit;
- a display area setting unit configured to set a display area being an arbitrary area portion displaying the extracted image signals;
- an image expanding unit configured to allocate the extracted image signals to the display area and generate an expanded image;
- an image synthesizing unit configured to synthesize the image signals outputted from the image expanding unit and image signals outputted from the image generating unit; and
- a signal determining unit configured to determine information on a program during reception from the digital signals,
- wherein the output from the image synthesizing unit is changed so that only the image signal outputted from the image generating unit is selectively outputted if the program during reception changes from one to a commercial message in the signal determining unit, and
- wherein if it is determined by the signal determining unit that the one program is changed to the commercial message and then the commercial message is changed to the one program: if setting is provided so that image signals synthesized by image signals outputted from the image generating unit and the image signal outputted from the image expanding unit are outputted from the image synthesizing unit, the output from the image synthesizing unit is changed so that image signals synthesized by image signals outputted from the image generating unit and the image signal outputted from the image expanding unit are outputted from the image synthesizing unit; and if setting is not provided so that image signals synthesized by image signals outputted from the image generating unit and the image signal outputted from the image expanding unit are outputted from the image synthesizing unit, the output from the image synthesizing unit is changed so that only the image signals outputted from the image generating unit are selectively outputted.

6. An image display device comprising:
- an image generating unit configured to generate image signals based on received digital signals;
- an image segmenting unit configured to extract the image signals included in a segment area being an arbitrary area portion from the image signals outputted form the image generating unit;
- a display area setting unit configured to set a display area being an arbitrary area portion displaying the extracted image signals;
- an image expanding unit configured to allocate the extracted image signals to the display area and generate an expanded image; and
- an image synthesizing unit configured to synthesize the image signals outputted from the image expanding unit and image signals outputted form the image generating unit,
- wherein the image segmenting unit changes the position of the segment area according to the amount of movement of the detected image signal if setting is provided to detect an image signal coinciding in pattern with the image signal in the segment area in an arbitrary point from the image signal outputted from the image generating unit.

7. The image display device according to claim 6, wherein the display area setting unit is capable of changing the position of the display area according to the amount of movement in the position of the segment area in the image segmenting unit.

8. The image display device according to claim 7, wherein if an image signal coinciding in pattern with the image signal in the segment area in an arbitrary point cannot be detected from the image signal outputted from the image generating unit, the output from the image synthesizing unit can be changed so that only the image signal outputted from the image generating unit is selectively outputted.

9. The image display device according to claim 6, wherein if an image signal coinciding in pattern with the image signal in the segment area in an arbitrary point cannot be detected from the image signal outputted from the image generating unit: if setting is provided so that only the image signal outputted from the image generating unit is selectively outputted, the output from the image synthesizing unit is changed so that only the image signal outputted from the image generating unit is selectively outputted; and if setting is not provided so that only the image signal outputted from the image generating unit is selectively outputted, the output from the image synthesizing unit is changed so that image signals synthesized by image signals outputted from the image generating unit and the image signal outputted from the image expanding unit are outputted from the image synthesizing unit.

10. An image display device comprising:
- an image generating unit configured to generate image signals based on received digital signals;
- an image segmenting unit configured to extract the image signals included in a segment area being an arbitrary area portion of a screen area by the image signals outputted from the image generating unit;
- a display area setting unit configured to set a display area being an arbitrary area portion displaying the extracted image signals;
- an image expanding unit configured to allocate the extracted image signals to the display area and generate an expanded image;
- an image synthesizing unit configured to synthesize the image signals outputted from the image expanding unit to be superposed on the image signals outputted from the image generating unit;
- a video output unit configured to cause a monitor to display the image synthesized by the image synthesizing unit; and
- a signal determining unit configured to determine information on a program during reception from the digital signals, wherein the output from the image synthesizing unit can be changed so that only the image signal outputted from the image generating unit is selectively outputted if the program during reception changes from one to the other or from one to a commercial message in the signal determining unit.

11. The image display device according to claim 10, wherein if it is determined by the signal determining unit that the program changes from the one program to the other or from the one to the commercial message: if setting is provided so that only the image signal outputted from the image generating unit is selectively outputted, the output from the image synthesizing unit is changed so that only the image signal outputted from the image generating unit is selectively outputted; and if setting is not provided so that only the image signal outputted from the image generating unit is selectively outputted, image signals synthesized by image signals outputted from the image generating unit and the image signal outputted from the image expanding unit are outputted from the image synthesizing unit.

12. The image display device according to claim 11, wherein if it is determined by the signal determining unit that the one program is changed to the commercial message and then the commercial message is changed to the one program: if setting is provided so that image signals synthesized by image signals outputted from the image generating unit and the image signal outputted from the image expanding unit are outputted from the image synthesizing unit, the output from the image synthesizing unit is changed so that image signals synthesized by image signals outputted from the image generating unit and the image signal outputted from the image expanding unit are outputted from the image synthesizing unit; and if setting is not provided so that image signals synthesized by image signals outputted from the image generating unit and the image signal outputted from the image expanding unit are outputted from the image synthesizing unit, the output from the image synthesizing unit is changed so that only the image signals outputted from the image generating unit are selectively outputted.

13. An image display device according to claim comprising:
  an image generating unit configured to generate image signals based on received digital signals;
  an image segmenting unit configured to extract the image signals included in a segment-area being an arbitrary area portion of a screen area by the image signals outputted from the image generating unit;
  a display area setting unit configured to set a display area being an arbitrary area portion displaying the extracted image signals;
  an image expanding unit configured to allocate the extracted image signals to the display area and generate an expanded image;
  an image synthesizing unit configured to synthesize the image signals outputted from the image expanding unit to be superposed on the image signals outputted from the image generating unit; and
  a video output unit configured to cause a monitor to display the image synthesized by the image synthesizing unit, wherein the image segmenting unit is capable of detecting an image signal coinciding in pattern with the image signal in the segment area in an arbitrary point from the image signal outputted from the image generating unit to change the position of the segment area according to the amount of movement of the detected image signal.

14. The image display device according to claim 13, wherein the image segmenting unit changes the position of the segment area according to the amount of movement of the detected image signal if setting is provided to detect an image signal coinciding in pattern with the image signal in the segment area in an arbitrary point from the image signal outputted from the image generating unit.

15. The image display device according to claim 14, wherein the display area setting unit is capable of changing the position of the display area according to the amount of movement in the position of the segment area in the image segmenting unit.

16. The image display device according to claim 15, wherein if an image signal coinciding in pattern with the image signal in the segment area in an arbitrary point cannot be detected from the image signal outputted from the image generating unit, the output from the image synthesizing unit can be changed so that only the image signal outputted from the image generating unit is selectively outputted.

* * * * *